(12) United States Patent
Hosokawa

(10) Patent No.: US 8,411,410 B2
(45) Date of Patent: Apr. 2, 2013

(54) FLAT NI PARTICLE, LAMINATED CERAMIC ELECTRONIC COMPONENT USING FLAT NI PARTICLE, AND PRODUCTION METHOD FLAT NI PARTICLE

(75) Inventor: Takao Hosokawa, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/403,136

(22) Filed: Feb. 23, 2012

(65) Prior Publication Data
US 2012/0148860 A1  Jun. 14, 2012

Related U.S. Application Data

(63) Continuation of application No. PCT/JP2010/067253, filed on Oct. 1, 2010.

(30) Foreign Application Priority Data

Oct. 5, 2009  (JP) ................. 2009-231627

(51) Int. Cl.
*H01G 4/00* (2006.01)
(52) U.S. Cl. .............. 361/303; 361/305; 428/402
(58) Field of Classification Search ........ 361/301.4, 361/303, 305; 428/402
See application file for complete search history.

(56) References Cited

U.S. PATENT DOCUMENTS

| | | | | |
|---|---|---|---|---|
| 4,130,696 A | * | 12/1978 | Gunther | 429/223 |
| 5,356,512 A | * | 10/1994 | Hosokawa | 216/20 |
| 5,872,695 A | * | 2/1999 | Fasano et al. | 361/301.4 |
| 6,346,497 B1 | * | 2/2002 | Nakamura et al. | 501/138 |
| 7,527,752 B2 | * | 5/2009 | Yoon et al. | 252/513 |
| 7,604,679 B2 | | 10/2009 | Hattori et al. | |
| 7,618,475 B2 | | 11/2009 | Yamashina et al. | |
| 8,092,636 B2 | * | 1/2012 | Kumakura | 156/325 |

FOREIGN PATENT DOCUMENTS

| | | |
|---|---|---|
| JP | 59-193294 | 11/1984 |
| JP | 2006-210214 A | 8/2006 |
| JP | 2006-328270 A | 12/2006 |
| JP | 2007-126744 A | 5/2007 |

OTHER PUBLICATIONS

International Search Report, mailed Dec. 7, 2010.

* cited by examiner

*Primary Examiner* — Cathy Lam
(74) *Attorney, Agent, or Firm* — Dickstein Shapiro LLP

(57) ABSTRACT

Provided is a flat Ni particle which has a large specific surface area, permitting efficient binder removal when the flat Ni particle is used for internal electrodes of a laminated ceramic electronic component. The flat Ni particle has a thickness t (m), a specific gravity $\rho$ (g/m$^3$), and a radius r (m), and a specific surface area $S_1$ (m$^2$/g), such that the specific surface area $S_1$ is adapted to have a relationship of $1.5 \times S_0 < S_1 < 1.9 \times S_0$ with a theoretical specific surface area in the case of assuming a surface to be completely smooth, represented by $S_0 = 2/(\rho \times t) + 2\sqrt{2}/(\rho \times r)$ (m$^2$/g).

6 Claims, 2 Drawing Sheets

FLAT NI PARTICLE, LAMINATED CERAMIC ELECTRONIC COMPONENT USING FLAT NI PARTICLE, AND PRODUCTION METHOD FLAT NI PARTICLE

This is a continuation of application Serial No. PCT/JP2010/067253, filed Oct. 1, 2010, the entire contents of which is incorporated herein by reference.

TECHNICAL FIELD

The present invention relates to a flat Ni particle, and more particularly, relates to a flat Ni particle which has a large specific surface area.

In addition, the present invention relates to a laminated ceramic electronic component formed using the flat Ni particle.

Furthermore, the present invention relates to a method for producing the flat Ni particle.

BACKGROUND ART

Methods for producing a flat (flake form) metal powder such as Ni particles, which have excellent mass production productivity, include a method for producing a metal powder disclosed in Patent Document 1 (Japanese Patent Application Laid-Open No. 2006-328270).

This method for producing a metal powder uses electroless plating, and includes the following steps:

1) providing a mold release layer on the surface of a substrate;
2) providing and activating a catalyst on the surface of the mold release layer;
3) generating an electroless plating film through contact with an electroless plating solution;
4) bringing the substrate with the electroless plating film into contact with a catalyst to dissolve and remove the mold release, and thereby separate the electroless plating film from the substrate; and
5) grinding the separated electroless plating film to obtain a metal powder.

The production method produces a metal powder of 0.01 to 0.5 μm in thickness and 1 to 300 μm in diameter.

For example, Ni particles produced by the method for producing a metal powder disclosed in Patent Document 1 are flat in shape and thin. Thus, when the Ni particles are used for internal electrodes of a laminated ceramic electronic component, the internal electrodes can be reduced in layer thickness.

PRIOR ART DOCUMENTS

Patent Document 1: Japanese Patent Application Laid-Open No. 2006-328270

DISCLOSURE OF THE INVENTION

Problem to be Solved by the Invention

The Ni particle produced by the method for producing a metal powder disclosed in Patent Document 1 has a quite smooth surface, and thus, when a binder containing this Ni particle is used to form internal electrodes of a laminated ceramic electronic component, the binder is not sufficiently released to the surroundings during the binder removal, and there is a possibility that the resulting laminated ceramic electronic component will have structural defects.

More specifically, the laminated ceramic electronic component is produced by, for example, applying a Ni paste containing the Ni particle onto surfaces of ceramic green sheets to become internal electrodes, stacking the ceramic green sheets to prepare a raw laminated body, and firing the raw laminated body. Prior to the firing, the raw laminated body is heated at a predetermined temperature to release unnecessary binder contained in the raw laminated body, that is, a binder removal step is effected. However, when the flat Ni particle produced by the method for producing a metal powder disclosed in Patent Document 1 is used in the Ni paste for internal electrodes, the release of the unnecessary binder to the outside is sometimes obstructed by the Ni particle with a quite smooth surface which acts as an obstacle in the binder removal step. Further, the laminated ceramic electronic component subjected to firing with remaining unnecessary binder has structural defects as a consequence of this characteristic, and has a decreased proportion of non-defective products, thus leading to a problem of insufficiency for practical use.

Means for Solving the Problem

The present invention has been achieved in order to remedy the problem of the conventional method for producing metal powder (Ni particle), and a flat Ni particle which has a thickness t (m), a specific gravity ρ ($g/m^3$), and a radius r (m) (obtained from half the length of a diagonal line in the case of assuming the planar shape to be a square), and a specific surface area $S_1$ ($m^2/g$), in which the specific surface area $S_1$ has a relationship of $1.5 \times S_0 < S_1 < 2.1 \times S_0$, with the theoretical specific surface area when assuming the surface to be completely smooth is represented by $S_0$ and is $=2/(\rho \times t)+2\sqrt{2}/(\rho \times r)$ ($m^2/g$). It is to be noted that the flat Ni particle preferably has a thickness of 100 nm or less, and further, more preferably of 50 nm or less. This is because when the flat Ni particle is used for internal electrodes of a laminated ceramic electronic component, the reduction of the internal electrodes in layer thickness can be promoted.

In addition, a laminated ceramic electronic component according to the present invention is adapted to use the flat Ni particle described above for internal electrodes.

In addition, a method for producing the flat Ni particle according to the present invention comprises the steps of: preparing (providing) a positive electrode and a negative electrode; immersing the positive electrode and the negative electrode in a Ni plating solution; applying an electric current between the positive electrode and negative electrode immersed in the Ni plating solution to form a Ni film on the surface of the negative electrode; separating the Ni film formed on the surface of the negative electrode; and grinding the separated Ni film to obtain a Ni particle, wherein the temperature of the negative electrode is adjusted to be 10° C. or more lower than the temperature of the Ni plating solution at the point of the Ni plating. It is to be noted that the temperature of the negative electrode is more preferably 20° C. or more lower than the temperature of the Ni plating solution at the point of immersing the positive electrode and the negative electrode in the Ni plating solution.

Effects of the Invention

The flat Ni particle according to the present invention has a large specific surface area, and has some degree of surface asperity. Thus, when the flat Ni particle is used for internal electrodes of a laminated ceramic electronic component, unnecessary binder can be released from gaps formed by the surface asperity during binder removal. With this result, the produced laminated ceramic electronic component can avoid structural defects.

In addition, the laminated ceramic electronic component according to the present invention has a high proportion of non-defective products.

Also, the method for producing a flat Ni particle according to the present invention can produce the above-described flat Ni particle according to the present invention.

DESCRIPTION OF CARRYING OUT THE INVENTION

Embodiments of the present invention will be described below.

EXAMPLE 1

Figure 1:
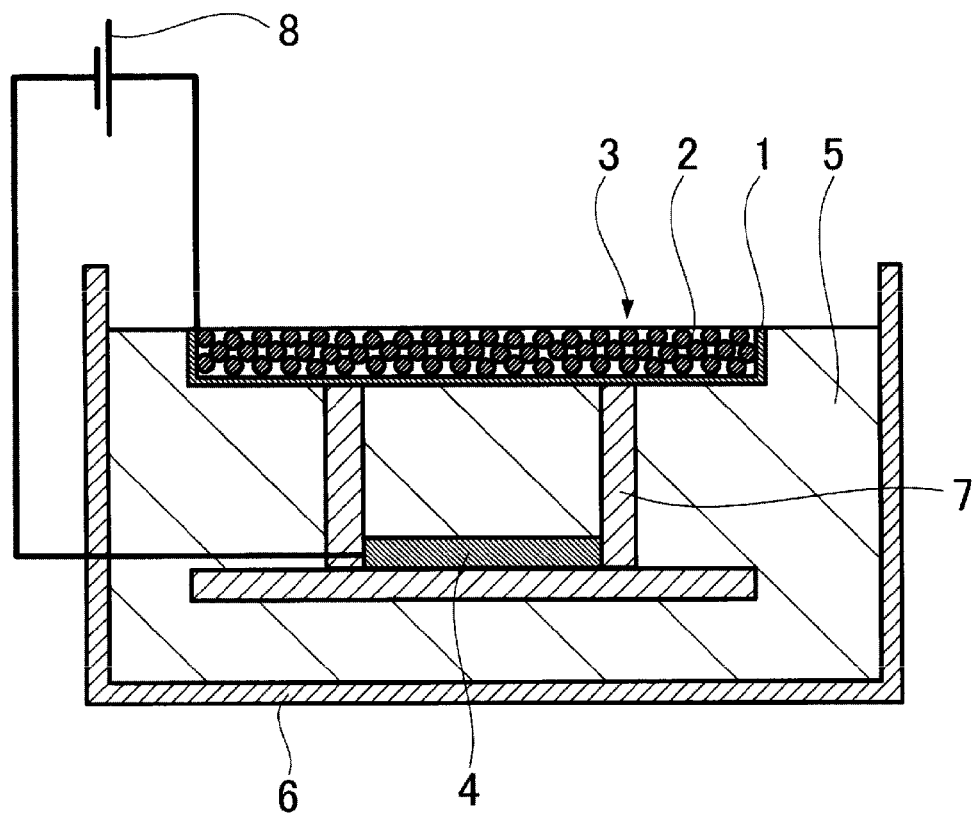
FIG. 1 is a cross-sectional view illustrating a step for use in the production of Ni particles according to Examples 1 and 2.

FIG. 1 is a cross-sectional view illustrating one of production steps in the production of a flat Ni particle according to Example 1.

In Example 1, a plurality of Ni chips 2 were put in a titanium anode case 1 whose dimensions were 200 mm in width, 220 mm in length, and 30 mm in height for achieving a positive electrode 3.

In addition, a titanium plate of 100 nm in width, 200 mm in length, and 5 mm in thickness was subjected to mirror finishing to achieve a negative electrode 4.

Also, a chlorinated Ni bath of $NiCl_2 \cdot 6H_2O$: 400 g/l and $H_3BO_3$: 35 g/l in composition at pH 4.2 was prepared as a Ni plating solution (electrolytic solution) 5.

Then, the Ni plating solution 5 heated to 60° C. was put in a vinyl chloride tank 6, and the positive electrode 3 and the negative electrode 4 were immersed in the Ni plating solution 5, and arranged so as to be opposed to each other. It is to be noted that the negative electrode 4 used had been kept at 40° C. in advance of being immersed. More specifically, the negative electrode 4 made 20° C. lower than the Ni plating solution 5 at the point of the immersion in the Ni plating solution 5. In addition, a shield plate 7 of vinyl chloride was placed in the tank 6 so as to cover the bottom and the right and left ends of the negative electrode (titanium plate) 4 in order to make the film thickness distribution uniform.

Next, while circulating the Ni plating solution 5 with a pump, an electric current was applied by a power source 8 between the positive electrode 3 and the negative electrode 4 to form a Ni film on the surface of the negative electrode 4. The electric current was adjusted to Dk: 30 A/dm$^2$, and the electric current value was adjusted to 54 A. It is to be noted that the plating time (cumulative time) was varied in the range of 145 milliseconds to 485 milliseconds.

Figure 2:
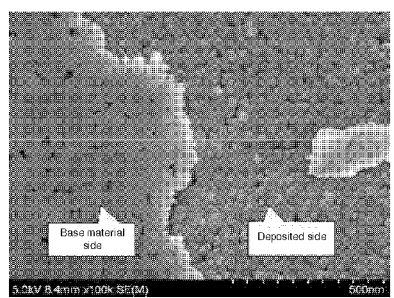
FIG. 2 is a SEM photograph showing a Ni film deposited in Example 1.

Immediately after the formation of the Ni film, the negative electrode 4 was pulled out of the tank 6, and washed under running water to separate and collect the Ni film from the negative electrode 4. FIG. 2 shows a SEM photograph of the Ni film separated and collected. From the SEM photograph, grains of deposited particles can be observed. The Ni film had almost no pinholes observed, and was a film with few defects.

When this Ni film was suspended in an aqueous solution and crushed by an ultrasonic homogenizer, a flat Ni particle according to the present example was obtained after a few seconds.

The measured specific surface area $S_1$ of the Ni particle was, for example, 18.9 m$^2$/g in the case of 25 nm in thickness and 2.0 μm in average particle diameter. It is to be noted that the specific surface area $S_1$ was measured by the BET method. The thickness was also measured with a fluorescent X-ray film thickness meter. In addition, the average particle diameter was obtained by observing the Ni film through a SEM, measuring the longer diameter of each Ni particle from the photograph, and regarding this longer diameter as the length of a diagonal line in the case of assuming the planar shape to be a square.

From the thickness t (m), specific gravity ρ (g/m$^3$), the radius r (m) of the Ni particle, the theoretical specific surface area $S_0$ in the case of assuming the surface to be completely smooth was found, with $S_0$ being represented by $2/(\rho \times t)+2\sqrt{2}/(\rho \times r)$ (m$^2$/g). It is to be noted that the specific gravity p of the Ni particle was considered $8.85 \times 10^6$.

Then the ratio ($S_1/S_0$) of the actually measured specific surface area $S_1$ to the theoretical specific surface area $S_0$ in the case of assuming the surface to be completely smooth was determined. In the case of 25 nm thickness, 2.0 μm in average particle diameter, and 18.9 m$^2$/g in specific surface area $S_1$ as mentioned previously, the ratio ($S_1/S_0$) was 2.05.

Table 1 shows the ratio ($S_1/S_0$) of the actually measured specific surface area $S_1$ to the theoretical specific surface area $S_0$ in the case of varying the plating time (cumulative time) in order to vary the thickness of the Ni particle produced and the average particle diameter.

TABLE 1

| No. | Thickness (nm) | Average particle diameter (μm) | Specific Surface area $S_1$ (m$^2$/g) | Theoretical specific surface area $S_2$ (m$^2$/g) | Ratio ($S_1/S_0$) |
| --- | --- | --- | --- | --- | --- |
| 1-1 | 25 | 2.0 | 18.9 | 9.2 | 2.05 |
| 1-2 | 25 | 1.5 | 19.2 | 9.3 | 2.08 |
| 1-3 | 35 | 2.1 | 10.6 | 6.6 | 1.60 |
| 1-4 | 35 | 1.4 | 12.6 | 6.7 | 1.88 |
| 1-5 | 50 | 2.3 | 8.3 | 4.7 | 1.78 |

The thickness of the Ni particle was varied in the range of 15 to 50 nm, whereas the average particle diameter was varied in the range of 1.4 to 2.3 μm, and the ratio ($S_1/S_0$) of the actually measured specific surface area $S_1$ to the theoretical specific surface area $S_0$ was 1.60 at a minimum and 2.08 at a maximum.

In the formula $S_0=2/(\rho \times t)+2\sqrt{2}/(\rho \times r)$ (m$^2$/g), which represents the theoretical specific surface area $S_0$ in the case of assuming the surface to be completely smooth, the first term (the first half section) means the area of the front and back of a flat metal particle (Ni particle), whereas the second term (the second half section) means the area of the side thereof, the second term has a lower contribution ratio, and the first term accounts for most of the surface area. For example, the ratio between the first term and the second term is 97:3 in the case of crushing a Ni film of 25 nm in thickness into a square of 2.0 μm in diagonal size, and it is determined that the first term is a prime factor. Also for this reason, the value of the specific surface area in the case of an average particle diameter on the order of several μm can be considered to represent a feature of the deposited metal film (Ni film), rather than representing a grinding state.

Furthermore, as described above, the ratio ($S_1/S_0$) of the actually measured specific surface area $S_1$ to the theoretical specific surface area $S_0$ is 1.60 at a minimum and 2.08 at a maximum, and it is determined therefrom that the flat Ni particle according to the present example has a large surface area, and has large front and back surface asperity to some extent.

EXAMPLE 2

In Example 2, the temperature of the negative electrode 4 in the immersion in the Ni plating solution 5 was varied between 20 and 65° C. On the other hand, the temperature of the Ni plating solution 5 was kept at a constant temperature of 60° C.

It is to be noted that temperature of the negative electrode 4 approaches 60° C., in such a way that the negative electrode 4 is immersed in the Ni plating solution 5, and then heated by the Ni plating solution 5 or cooled by the Ni plating solution, while the deposition of the Ni film is completed before the temperature of the negative electrode 4 reaches 60° C. if there is a large difference in temperature between the negative electrode 4 and the Ni plating solution 5 to some extent, because of the short plating time of 1 second or less.

In addition, the plating time (cumulative time) in Example 2 was also varied in order to vary the thickness of the Ni film. The other conditions in Example 2 were set in the same way as in Example 1.

Table 2 shows the relationship of whether or not it is possible to separate and collect respective Ni films of 25 nm, 50 nm, and 100 nm in thickness, with the difference in temperature between the negative electrode 4 and the Ni plating solution 5. In the table, the mark "○" means a good product, the mark "Δ" means a partially defective product, and the mark "x" means a defective product.

From this result, it is determined that thinner Ni films can be separated and collected when the negative electrode 4 is cooled before the immersion in the Ni plating solution 5. For example, the temperature of the negative electrode 4 is preferably 10° C. or more lower than the temperature of the Ni plating solution 5 in order to separate and collect the Ni film of 50 nm in thickness. In addition, the temperature of the negative electrode 4 is preferably 20° C. or more lower than the temperature of the Ni plating solution 5 in order to separate and collect the Ni film of 25 nm in thickness.

The reason that thinner Ni films can be separated and collected when the temperature of the negative electrode 4 is lower than the temperature of the Ni plating solution 5 can be considered as follows. When the temperature of the negative electrode 4 is lower than the temperature of the Ni plating solution 5, the vicinity of the plating interface is likely to be a diffusion-controlled environment. Even though an experiment of lowering the temperature of the Ni plating solution 5 was also carried out, the effect of facilitating the separation and collection was not produced. Thus, the ability to separate and collect the thin Ni films is not considered to be due to the effect of the plating solution interface. For this reason, it is considered that the temperature of the negative electrode 4 made lower than the temperature of the Ni plating solution 5 increases the strain between the deposited Ni film and the negative electrode 4, thereby making the Ni film likely to be separated. Therefore, the increased difference in temperature between the negative electrode 4 and the Ni plating solution 5 makes it possible to separate thinner Ni films.

In addition, a totally chlorinated Ni bath was used in the present example as the Ni plating solution 5, and the Ni films deposited from this bath are large in internal stress. Although the reason thereof is not known, the selection of the bath is also considered to make an effective contribution.

EXAMPLE 3

The Ni particle of 25 nm in thickness produced in Example 1 was used for internal electrodes to produce a laminated

TABLE 2

| No. | Temperature of negative electrode (° C.) | Temperature of Ni plating solution (° C.) | Difference in temperature (Negative electrode − Ni plating solution) (° C.) | Whether possible or not to separate and collect Ni film of 25 nm in thickness | Whether possible or not to separate and collect Ni film of 50 nm in thickness | Whether possible or not to separate and collect Ni film of 100 nm in thickness |
|---|---|---|---|---|---|---|
| 2-1 | 65 | 60 | 5 | X | X | ○ |
| 2-2 | 60 | 60 | 0 | X | X | ○ |
| 2-3 | 50 | 60 | −10 | Δ | ○ | ○ |
| 2-4 | 40 | 60 | −20 | ○ | ○ | ○ |
| 2-5 | 30 | 60 | −30 | ○ | ○ | ○ |
| 2-6 | 20 | 60 | −40 | ○ | ○ | ○ |

The Table shows that when the temperature of the negative electrode 4 was higher than or equal to the temperature of the Ni plating solution 5, it was possible to separate and collect the Ni film of 100 nm in thickness, while it was not possible to separate and collect the Ni films of 50 nm or less in thickness.

When the temperature of the negative electrode 4 was 10° C. lower than the temperature of the Ni plating solution 5, it was possible to separate and collect the Ni film of 50 nm in thickness, and it was also partially possible to separate and collect the Ni film of 25 nm or less in thickness.

Figure 3:
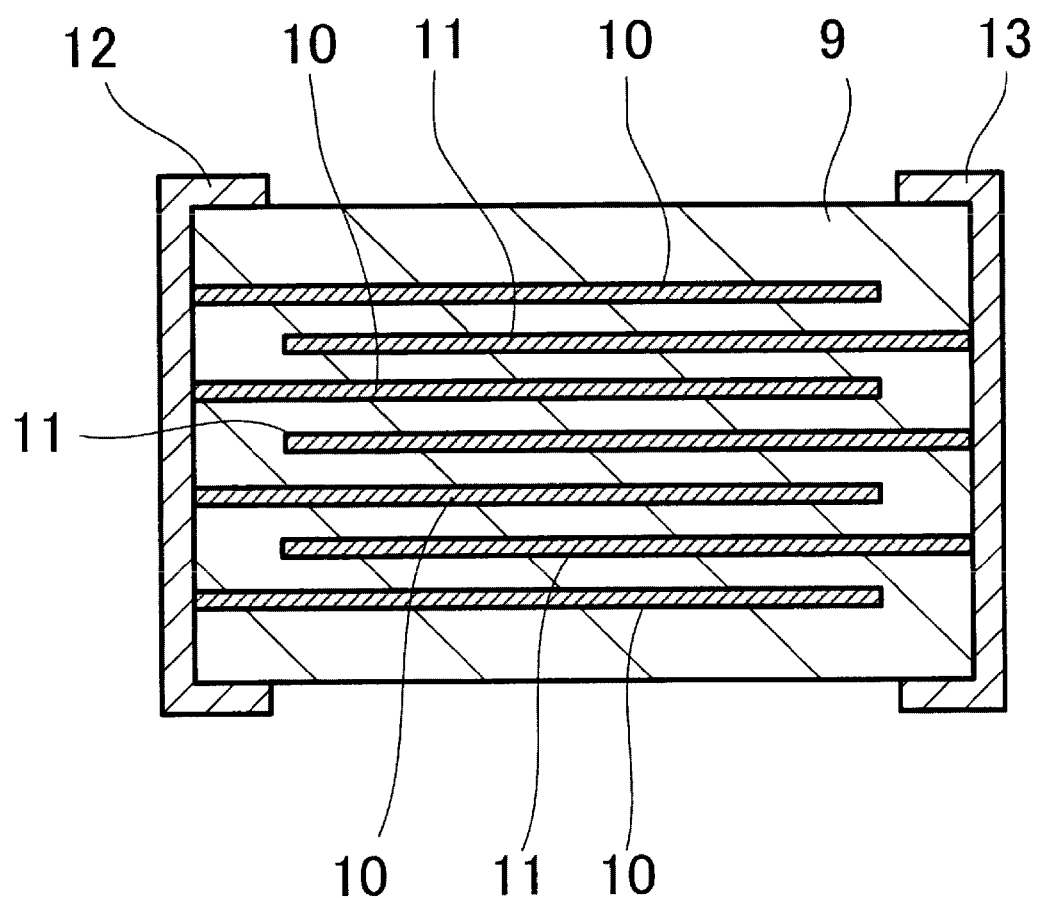
FIG. 3 is a cross-sectional view illustrating a laminated ceramic capacitor (laminated ceramic electronic component) according to Example 3.

When the temperature of the negative electrode 4 was 20° C. lower than the temperature of the Ni plating solution 5, it was possible to separate and collect the respective Ni films of 100 nm, 50 nm, and 25 nm in thickness.

ceramic electronic component, specifically, a laminated ceramic capacitor. FIG. 3 is a cross-sectional view illustrating the laminated ceramic capacitor.

This laminated ceramic capacitor has a structure of a ceramic body 9 containing barium titanate or the like as its main constituent in the shape of a rectangular parallelepiped, which has therein alternately arranged internal electrodes 10 exposed at one end surface and internal electrodes 11 exposed at the other end surface, and has an external electrode 11 formed on one end surface of the ceramic body 9 to provide electrical conduction to the internal electrodes 10 and an external electrode 13 formed on the other end surface of the ceramic body 9 to provide electrical conduction to the internal electrodes 11. In the present example, the flat Ni particle of 25 nm in thickness, produced in Example 1, was used as a material for the internal electrodes 10, 11.

A method for producing this laminated ceramic capacitor will be described below.

First, the flat Ni particle was dispersed in a resin and a solvent to create an electrode paste. It is to be noted that the resin may be any type, and acrylic resins, cellulosic resins, butyral resins, alkyd resins, etc. can be used singularly or in a mixture. In addition, the solvent may also be any type, and glycols, terpineol, cellosolves, acetic esters, etc. can be used.

Next, green sheets were prepared which had a barium titanate-based ceramic dispersed in an organic binder. In this example, large mother green sheets were prepared from which a large number of green sheets could be obtained.

Thereafter, screen printing was used to print the electrode paste in a desirably shaped pattern for internal electrodes on the surfaces of some of the mother green sheets.

Next, the mother green sheets with the internal electrodes printed thereon and the mother green sheets with no internal electrodes printed thereon were stacked in a predetermined order, and subjected to pressure bonding to obtain a large unfired ceramic body including therein the electrode paste for internal electrodes. This large ceramic body is intended to allow a plurality of ceramic bodies to be obtained therefrom.

The large unfired ceramic body was then cut into a plurality of unfired ceramic bodies.

Next, the cut unfired ceramic bodies were heated at a predetermined temperature to release unnecessary binder in the ceramic bodies to the outside surroundings (binder removal step), and subsequently subjected to firing in accordance with a predetermined profile (firing step), thereby achieving the ceramic body 9 with the internal electrodes 10, 11 formed therein. In this case, the green sheets constituting the unfired ceramic bodies and the electrode paste for the internal electrodes are fired at the same time.

Next, a copper electrode paste was applied onto both ends of the ceramic body 9, and subjected to firing to form the external electrodes 12, 13. It is to be noted that the electrode paste may be any type, and copper alloys, silver, silver alloys, nickel, nickel alloys, etc. can be used in addition to copper.

The laminated ceramic capacitor produced by the production method described above uses the flat Ni particle produced in Example 1 for the material of the internal electrodes. This Ni particle has a large specific surface area, and has large surface asperity to some extent. Therefore, during in the binder removal in the process of producing this laminated ceramic capacitor, unnecessary binder is released efficiently from gaps formed by the surface asperity to the both sides of the internal electrodes 10, 11. With this result, this laminated ceramic capacitor has no structural defective caused by an unnecessary binder remaining in firing. In addition, the Ni particle used for the internal electrodes is flat in shape and small in thickness, and thus makes a contribution to the reduction of this laminated ceramic capacitor thickness.

DESCRIPTION OF REFERENCE SYMBOLS

| | |
|---|---|
| 1: | titanium case |
| 2: | Ni chip |
| 3: | positive electrode |
| 4: | negative electrode |
| 5: | Ni plating solution |
| 6: | tank |
| 7: | shield plate |
| 8: | power source |
| 9: | ceramic body |
| 10, 11: | internal electrodes |
| 12, 13: | external electrodes |

The invention claimed is:

1. A laminated ceramic electronic component having an internal electrode comprising a flat Ni particle having a thickness t (m), a specific gravity $\rho$ (g/m$^3$), and a radius r (m) obtained from half the length of a diagonal line in the case of assuming a planar shape to be a square, and a specific surface area $S_1$ (m$^2$/g), wherein the specific surface area $S_1$ has a relationship of $1.5 \times S_0 < S_1 < 2.1 \times S_0$ with a theoretical specific surface area $S_0$ in the case of assuming a surface to be completely smooth represented by $S_0 = 2/(\rho \times t)$, and wherein the particle has an average diameter of at least 1.4 μm.

2. A laminated ceramic electronic component having an internal electrode according to claim 1, wherein the flat Ni particle has a thickness of 100 nm or less.

3. A laminated ceramic electronic component having an internal electrode comprising the flat Ni particle according to claim 2, wherein the flat Ni particle has a thickness of 50 nm or less.

4. A laminated ceramic electronic component having an internal electrode according to claim 1, wherein $1.60 \times S_0 \leq S_1 \leq 2.08 \times S_0$.

5. A laminated ceramic electronic component having an internal electrode comprising the flat Ni particle according to claim 4, wherein the flat Ni particle has a thickness of 100 nm or less.

6. A laminated ceramic electronic component having an internal electrode according to claim 1, wherein the flat Ni particle has a thickness of 50 nm or less.

* * * * *